US010133793B2

(12) United States Patent
Seemann et al.

(10) Patent No.: US 10,133,793 B2
(45) Date of Patent: Nov. 20, 2018

(54) TAG CLOUD VISUALIZATION AND/OR FILTER FOR LARGE DATA VOLUMES

(71) Applicants: Patricia Seemann, Limburgerhof (DE); Mandana Samii, Heidelberg (DE); Martine Clemot, Stutensee (DE)

(72) Inventors: Patricia Seemann, Limburgerhof (DE); Mandana Samii, Heidelberg (DE); Martine Clemot, Stutensee (DE)

(73) Assignee: SAP SE, Walldorf (DE)

(*) Notice: Subject to any disclaimer, the term of this patent is extended or adjusted under 35 U.S.C. 154(b) by 653 days.

(21) Appl. No.: 14/644,593

(22) Filed: Mar. 11, 2015

(65) Prior Publication Data
US 2016/0267147 A1 Sep. 15, 2016

(51) Int. Cl.
G06F 17/30 (2006.01)
G06F 15/16 (2006.01)

(52) U.S. Cl.
CPC .. G06F 17/30554 (2013.01); G06F 17/30867 (2013.01)

(58) Field of Classification Search
CPC ............ G06F 17/30554; G06F 17/30867
USPC ............................................. 707/725
See application file for complete search history.

(56) References Cited

U.S. PATENT DOCUMENTS

| 9,286,400 | B2* | 3/2016 | Chakra | G06F 17/30867 |
| 2010/0318891 | A1* | 12/2010 | Lo | G06F 17/30554 715/214 |
| 2013/0007661 | A1* | 1/2013 | Klappert | G06F 3/0481 715/811 |
| 2013/0174074 | A1* | 7/2013 | Strzygowski | G06F 3/048 715/771 |
| 2014/0195950 | A1* | 7/2014 | Diament | G06F 17/30958 707/736 |
| 2014/0330770 | A1* | 11/2014 | Yerli | G06F 17/30867 707/609 |
| 2016/0078352 | A1* | 3/2016 | Pallath | G06T 11/60 706/11 |

* cited by examiner

Primary Examiner — Usmaan Saeed
Assistant Examiner — Brian R. Weinrich
(74) Attorney, Agent, or Firm — Fountainhead Law Group P.C.

(57) ABSTRACT

An interactive tag cloud provides an intuitive interface to large data volumes. Where the data is a large table, an overview afforded by the tag cloud may contain relevant table information ranked by priority and volume, represented in different categories. The tag cloud may be used to filter that big data in an efficient manner. This allows an ordinary (i.e., non-developer) user of the database to quickly assess high level contours of the data volumes, and also to filter that data in order to focus on specific tasks. The interactive tag cloud visualization may indicate data priority according to frequency of incidence of a dimension in database records, or according to other criteria such as importance derived from date information. The tag cloud affords visibility to aggregated big data content and also of filtered data, prior to the user having to immediately drill down in order to access details thereof.

17 Claims, 10 Drawing Sheets

FIG. 3A

First Quadrant

| Model ⌄ |

| By Number ⌄ |

Second Quadrant

| Status ⌄ |

| By Criticality ⌄ |

Third Quadrant

| Location ⌄ |

| By Usage ⌄ |

Fourth Quadrant

| Installation Date ⌄ |

| By Importance ⌄ |    APPLY

FIG. 3C

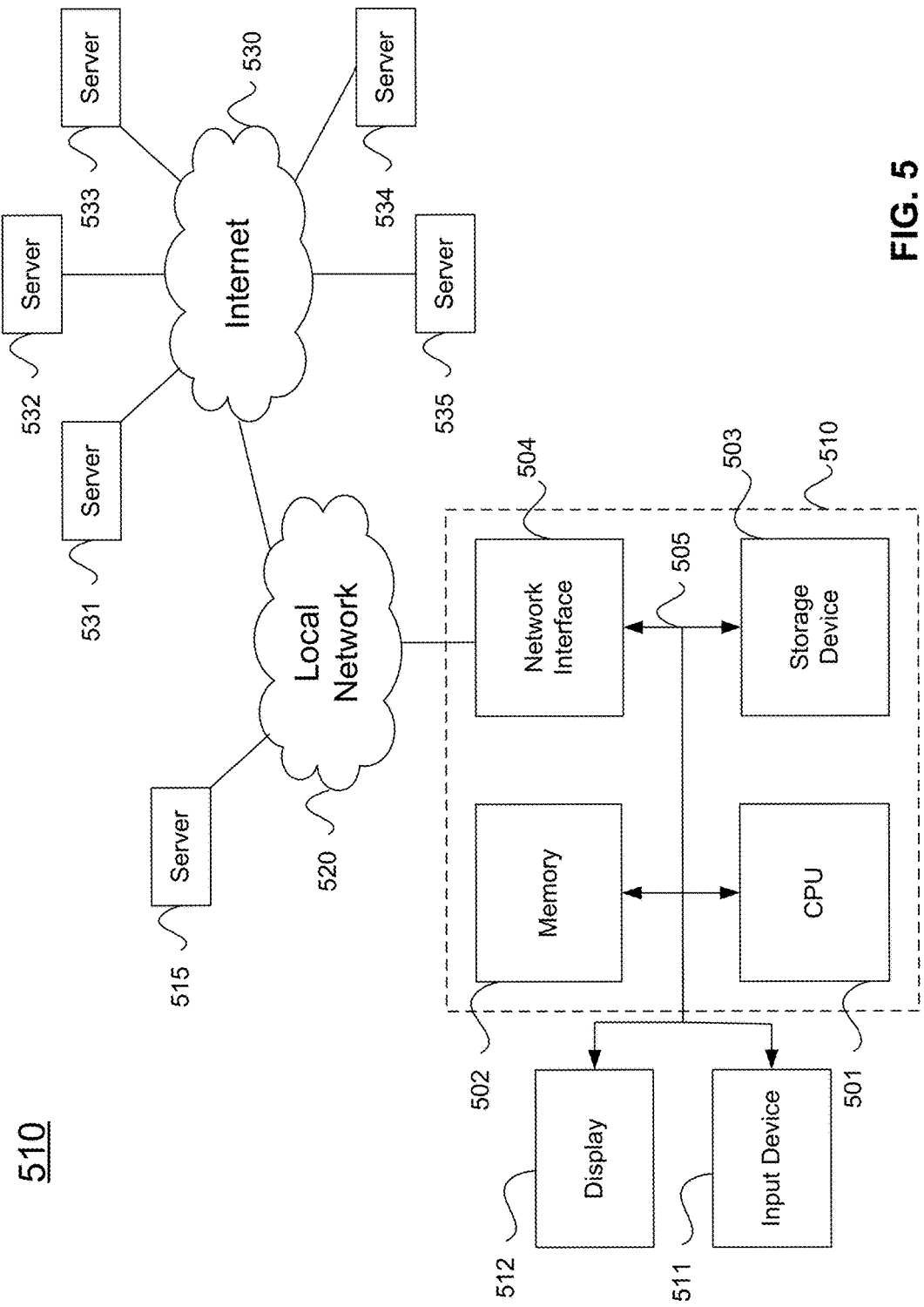

TAG CLOUD VISUALIZATION AND/OR FILTER FOR LARGE DATA VOLUMES

BACKGROUND

Unless otherwise indicated herein, the approaches described in this section are not prior art to the claims in this application and are not admitted to be prior art by inclusion in this section.

Embodiments relate to interfaces for accessing data, and in particular, to a user interface featuring an interactive tag cloud for visualizing and/or filtering large data volumes.

With the evolution in sophistication and power of databases, stored data may be available for visualization and analysis in increasingly large volumes. Such "big data" can comprise millions or even billions of different records. Moreover those records may be structured as multi-faceted data objects, whose complex internal organization may not be readily recognized and understood by an ordinary (e.g., non-developer) database user.

Such a typical user may seek access to data stored in a very large volume format (e.g., a large table). Before confronting the data in its full scope, the user may first seek to gain a useful overview thereof. However the sheer size and/or complexity of the stored data may reduce its transparency. And, a merely truncated view of the available data may not accurately represent its full size and/or properties.

SUMMARY

A data interface in the form of an interactive tag cloud, provides a useful overview of content for large volumes of data. The interactive tag cloud may also be used to filter that big data in an efficient and intuitive manner. Where, for example, the data is in the form of a large table, the overview afforded by the tag cloud may contain relevant table information ranked by priority and volume, represented in different categories. This allows an ordinary (i.e., non-developer) user of the database to quickly assess high level contours of the stored data, and to filter that data to focus on specific tasks. In certain embodiments the tag cloud may indicate relevance of the data according to frequency of incidence of a dimension in database records, or according to other criteria such as importance derived from date information. Such intuitive visualization of data afforded ordinary users by the interactive tag cloud, can allow display of aggregated big data content, and further permits filtering that big data prior to requiring the user to drill down into the details thereof.

An embodiment of a computer-implemented method comprises providing an engine in communication with a database storing a plurality of records comprising a first dimension and a second dimension. The engine creates from the plurality of records, a visualization comprising a first tag cloud region including a first tag of font size reflecting a first relevance criterion of a measure of the first dimension, and a second tag cloud region including a second tag cloud of font size reflecting a second relevance criterion of a measure of the second dimension. The engine displays the visualization to a user.

A non-transitory computer readable storage medium embodies a computer program for performing a method comprising providing an engine in communication with a database storing a plurality of records comprising a first dimension and a second dimension. The engine creates from the plurality of records, a visualization comprising a first tag cloud region including a first tag of font size reflecting a first relevance criterion of a measure of the first dimension, and a second tag cloud region including a second tag cloud of font size reflecting a second relevance criterion of a measure of the second dimension. The engine displays the visualization to a user. The engine receives a filter parameter input to the visualization. The engine processes the plurality of records to create an updated visualization reflecting the filter parameter input, and the engine displays the updated visualization to the user.

An embodiment of a computer system comprises one or more processors and a software program, executable on said computer system. The software program configured to cause an engine to communicate with a database storing a plurality of records comprising a first dimension and a second dimension. The software program is configured to cause the engine to create from the plurality of records a visualization comprising a first tag cloud region including a first tag of font size reflecting a first relevance criterion of a measure of the first dimension, and a second tag cloud region including a second tag cloud of font size reflecting a second relevance criterion of a measure of the second dimension. The software program is configured to cause the engine to display the visualization to a user. The software program is configured to cause the engine to receive a filter parameter input to the visualization. The software program is configured to cause the engine to process the plurality of records to create an updated visualization reflecting the filter parameter input, and to display the updated visualization to the user.

Certain embodiments further comprise the engine receiving a filter parameter input to the visualization, the engine processing the plurality of records to create an updated visualization reflecting the filter parameter input, the engine displaying the updated visualization to the user.

In some embodiments the filter parameter input specifies a third dimension of the plurality of records, and the updated visualization further comprises a third tag cloud region.

According to particular embodiments the filter parameter input changes the first relevance criterion.

In various embodiments the first relevance criterion comprises a frequency of appearance.

In certain embodiments the first relevance criterion comprises temporal information.

In some embodiments the filter parameter input comprises interaction with the first tag.

In particular embodiments the filter parameter input comprises interaction with a dimension region label.

In various embodiments the filter parameter input comprises interaction with a panel.

According to some embodiments the first relevance criterion and the second relevance criterion are the same.

The following detailed description and accompanying drawings provide a better understanding of the nature and advantages of embodiments.

BRIEF DESCRIPTION OF THE DRAWINGS

FIGS. 3A-C are mockups of a tag cloud interface according to the example.

FIG. 5 illustrates an example of a computer system.

DETAILED DESCRIPTION

Described herein are systems and methods providing an interactive tag cloud for visualizing and/or filtering large data volumes. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

A data interface in the form of an interactive tag cloud, provides a useful overview of content for large volumes of data. The interactive tag cloud may also be used to filter that big data in an efficient and intuitive manner. Where, for example, the data is in the form of a large table, the overview afforded by the tag cloud may contain relevant table information ranked by priority and volume, represented in different categories. This allows an ordinary database user (i.e., non-developer) to quickly assess high level contours of the data, and to filter the data to focus on specific tasks. In certain embodiments the tag cloud may indicate relevance of the data according to frequency of incidence of a dimension in database records, or according to other criteria such as importance derived from date information. Intuitive visualization of data afforded ordinary users by the interactive tag cloud, can display aggregation of big data content, and further allows filtering that big data prior to requiring the user to drill down into the details thereof.

Figure 1:
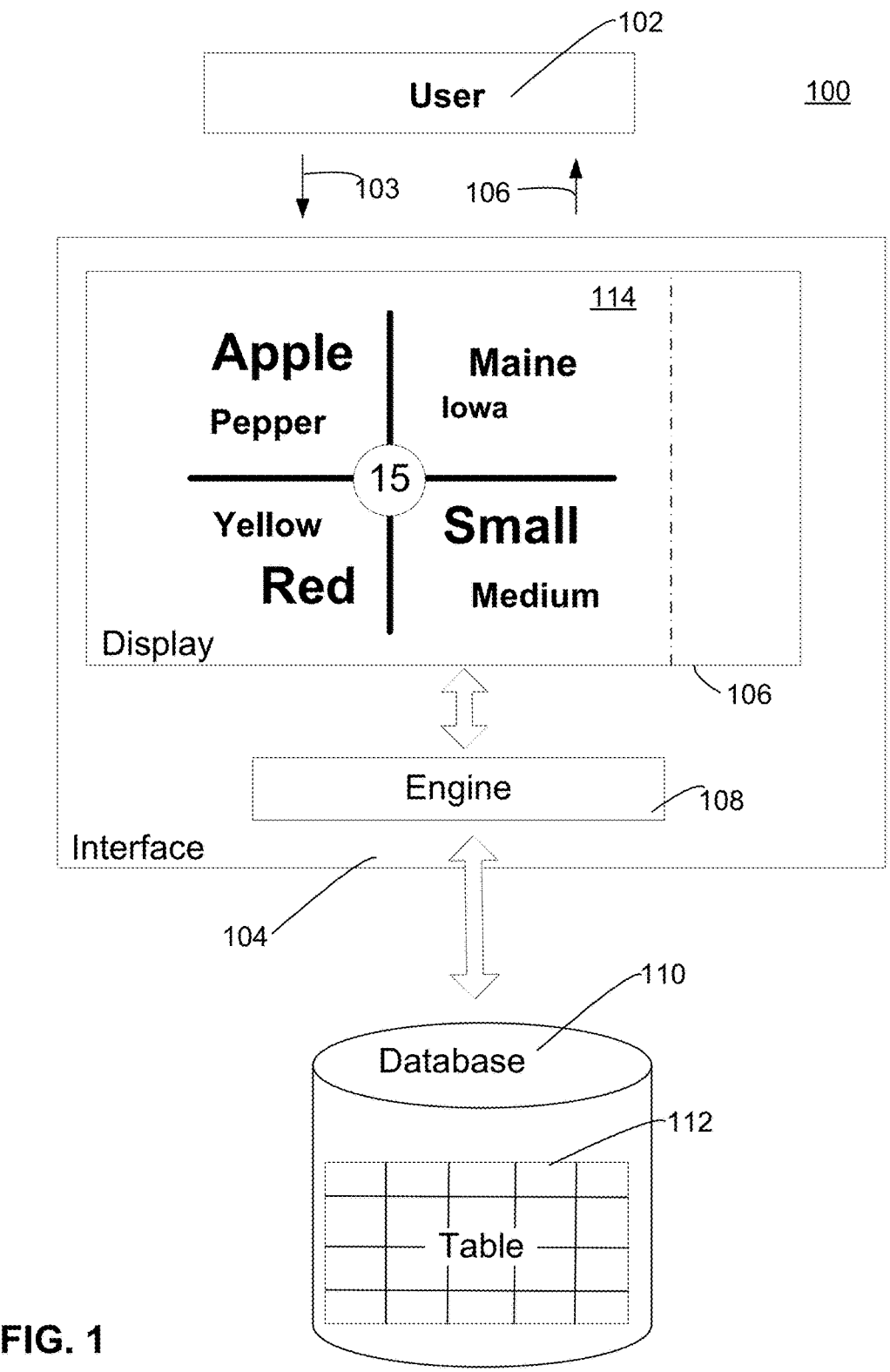
FIG. 1 is a simplified view of an embodiment of a system configured to provide an interactive tag cloud interface to a large data volume.

FIG. 1 shows a simplified view of a system 100 according to an embodiment that is configured to provide an interactive tag cloud. Specifically, a user 102 is in communication to provide input 103 to an interface 104. As discussed below, this input may take the form of interaction with one or more elements of a tag cloud that is displayed by the interface.

The interface comprises a display 106 and an engine 108. The engine is in communication with database 110. That database is configured to store data in the form of a table 112. According to certain embodiments, the table comprises a plurality of rows of records, each record structured according to one or more dimensions corresponding to different columns.

The engine is configured to access the database data, and generate therefrom an interactive tag cloud 114. Details regarding the interactive tag cloud are provided further below.

According to certain embodiments, the integrated tag cloud can be embedded as a frontend control in different front end technologies, e.g., the FIORI platform available from SAP SE of Walldorf, Germany. Alternatively, the interactive tag cloud can be implemented in a user interface that is natively built (e.g., in HTML)

Business data may be retrieved during runtime from backend applications. One example is the HANA in-memory database available from SAP AG. However, this is not required and alternatively data from other types of databases may be referenced by the interactive tag cloud interface on the front end.

FIG. 1 is a simplified view of one embodiment of a system for purposes of illustration. Thus while FIG. 1 shows the interface engine as separate from the database, in certain embodiments the engine could be part of the database, for example the processing engine of an in-memory database architecture.

Figure 1A:
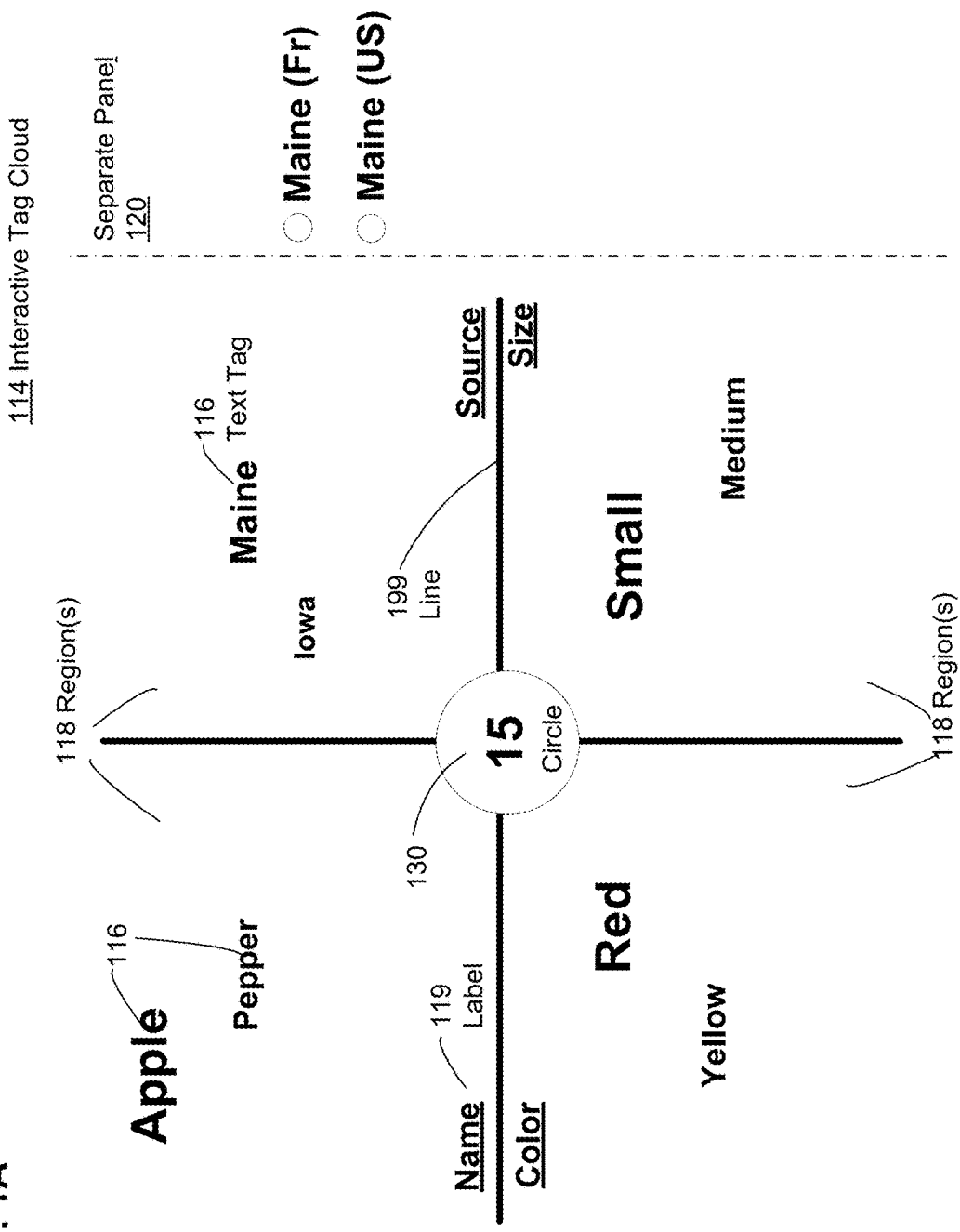
FIG. 1A shows an enlarged view of an example of an interactive tag cloud interface according to an embodiment.

FIG. 1A shows an enlarged, simplified view of an embodiment of an interactive tag cloud which may be utilized to provide an overview and/or filtering of database data. In particular, tag cloud 114 comprises text tags 116 corresponding to various dimensions of the data records, organized according to region 118. The dimension regions further include a respective label 119. The dimension regions are separated by lines 199.

While the particular embodiment of an interactive tag cloud shown in FIG. 1A comprises four dimension regions (also referred to herein as quadrants), this is not required. An interactive tag cloud is not limited to any particular number of dimension regions, and could include a number lesser or greater than four. As one example an embodiment of an interactive tag cloud interface that exhibits a number of dimension regions greater than four, could resemble a pie shape.

In this simplified example, the database stores a plurality of records regarding foodstuffs. A total number of available records (here fifteen), may be indicated in a circle 130 present at the center of the tag cloud.

The database may store these records according to the following specific dimensions:
- item name (e.g., apple or pepper)
- source province (e.g., Maine or Iowa)
- color (e.g., yellow or red)
- item size (e.g., small, medium, or large)

The font size of the particular tag in the tag cloud, reflects its relevance. In certain embodiments, criteria for relevance may be based upon a frequency of incidence of the dimension in the database data (e.g., many of the foodstuffs are red apples).

Alternatively however, different criteria for relevance may be used. Thus relevance determining font size of the tag in the interactive tag cloud, may be dictated by considerations other than frequency of its appearance in records of the database. In one example, tag font size could be determined by a criticality indicated by temporal information (e.g., foodstuff shipment date) stored within the database.

Also included in the interactive tag cloud, is a separate panel 120. That panel may include functionality affording the user the ability to communicate with the interface apart from interacting with the tags themselves. Such interaction with a panel may be particularly useful for performing filtering of the overall data set, as is now discussed.

In particular, the simplified tag cloud of FIG. 1A shows dimensions and values thereof, that are relevant to the entire data set. In this manner, a user may be quickly afforded with an overview thereof, even where the number of records in the data set is extremely large.

However a user may often seek to refine views of the database data by performing filtering actions. Accordingly, embodiments may also provide the ability to filter the database data based upon user interaction with the tag cloud.

Specifically by selecting a particular tag, a user may limit the data that is shown in the tag cloud. For example, by selecting the tag "Maine", a user may narrow the displayed tags to only those records containing the measure "Maine".

Moreover, by interacting with the panel of the interface, a user may further filter results to select between records. Thus, a user may select a box to differentiate between two different agricultural regions having the name "Maine": the Province of Maine in France, and the State of Maine in the United States.

The user can select one or more tags in all four quadrants of the cloud. From the filter the user can jump to a table, which is filtered according to the filter criteria defined in the target filter(s).

An interface according to an embodiment may allow exchange/shifting of the dimensions represented in the quadrants. An embodiment of an interface may allow a user to locate and/or explore less relevant entries within a given quadrant.

Figure 1B:
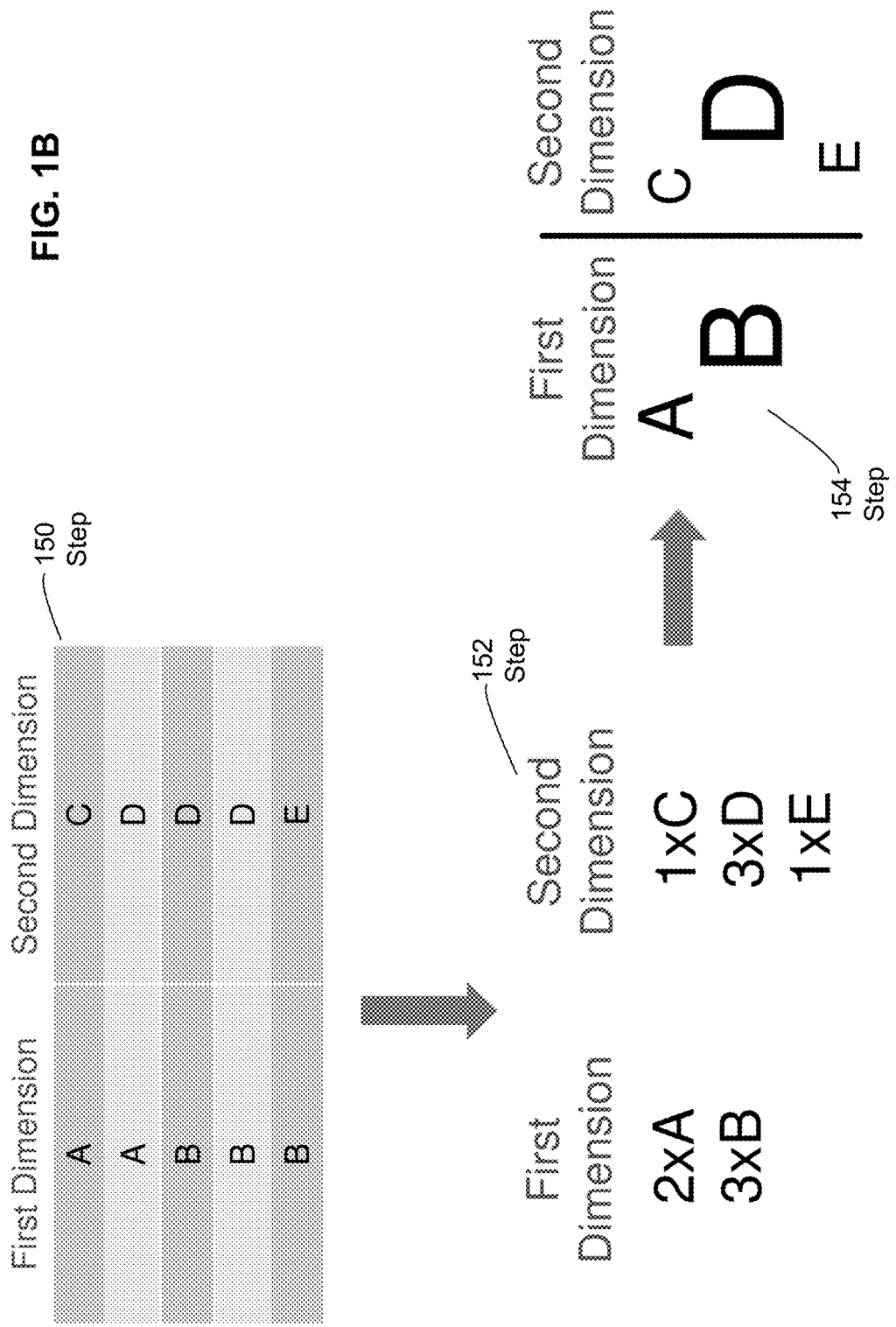
FIG. 1B shows a simplified view of the creation of an interactive tag cloud from stored data according to an embodiment.

FIG. 1B shows a highly simplified example of the generation of an interactive tag cloud from stored data, according to the criteria: "By Number of Elements". In step 150, a volume of stored data comprising various measures that are organized according to dimensions (here, two), is provided.

In step 152 an engine analyzes the volume of stored data to provide a count of particular measures according to dimension. In step 154 the tag cloud including tags having a font size reflecting the count, is generated by the engine.

Figure 2:
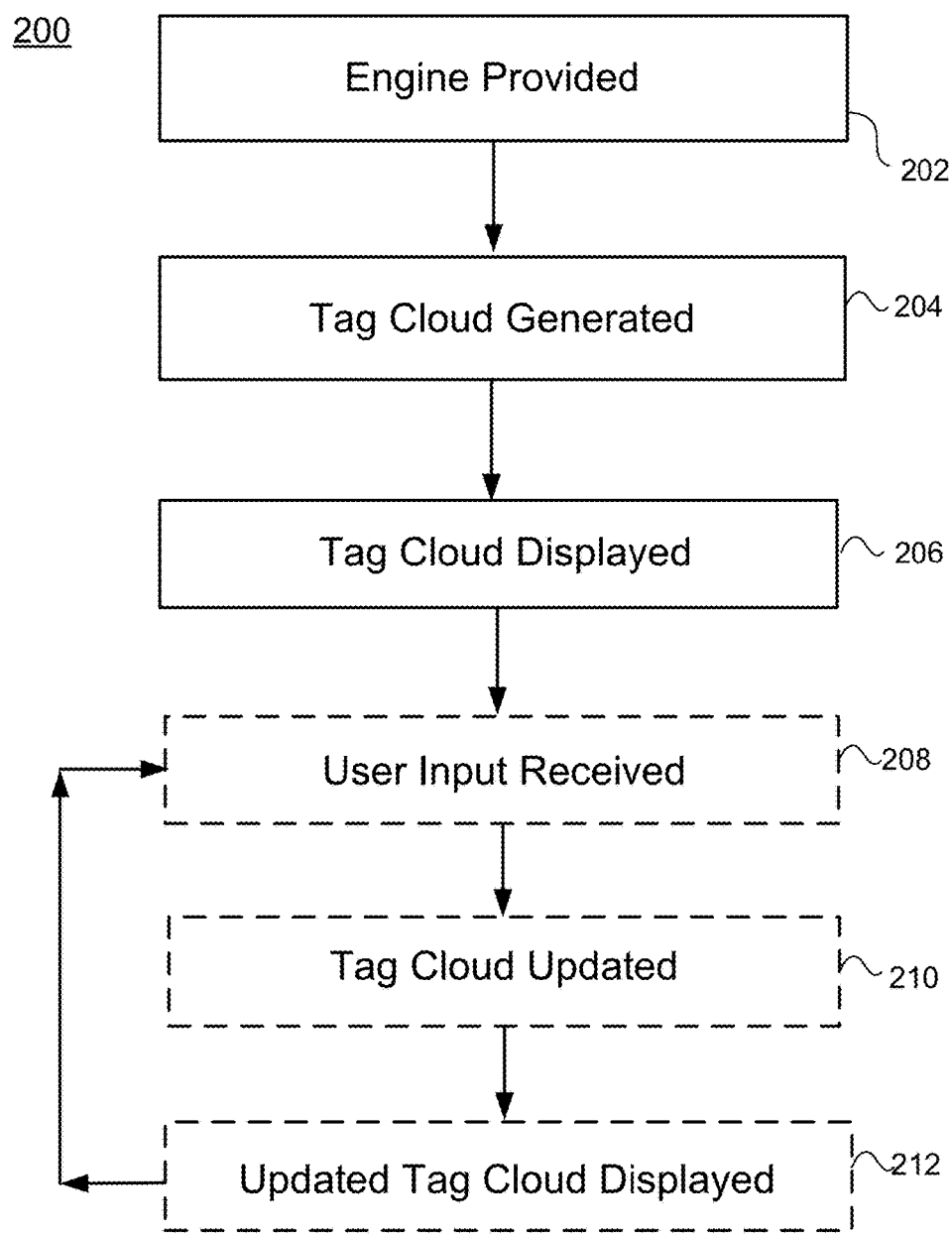
FIG. 2 is a simplified flow diagram of a process flow according to an embodiment.

FIG. 2 is a simplified flow diagram showing a method 200 according to an embodiment. In a first step 202, an engine is provided in communication with a data set comprising a plurality of different dimensions.

In a second step 204, the engine generates an interactive tag cloud comprising a plurality of tags representing dimension values. These tags are positioned within regions corresponding to different dimensions of the stored data.

In a third step 206, the interactive tag cloud is displayed to a user.

In an optional fourth step 208, the engine receives a further input from a user in the form of an interaction with the tag cloud. In an optional fifth step 210, the engine processes the input to filter the data according to that further input and produce an updated tag cloud.

In an optional sixth step 212, the updated tag cloud is displayed to a user. The process can then continue in an iterative manner to receive further inputs from the user changing the filter parameters. Such user input may include clicking a first button to return to the original default tag cloud representing an overview of the data set.

Alternatively, a user may click a second button to "Save as default". Then, the next time the user enters the screen, this selection is shown.

Further details regarding use of an interactive tag cloud for visualization and/or filtering large data volumes, are provided in connection with the following specific example.

EXAMPLE

One example of using an interactive tag cloud according to an embodiment, is now presented in connection with visualization/filtering records of various manufactured components (equipment). This example is illustrated in connection with FIGS. 3A-3C.

Figure 3:
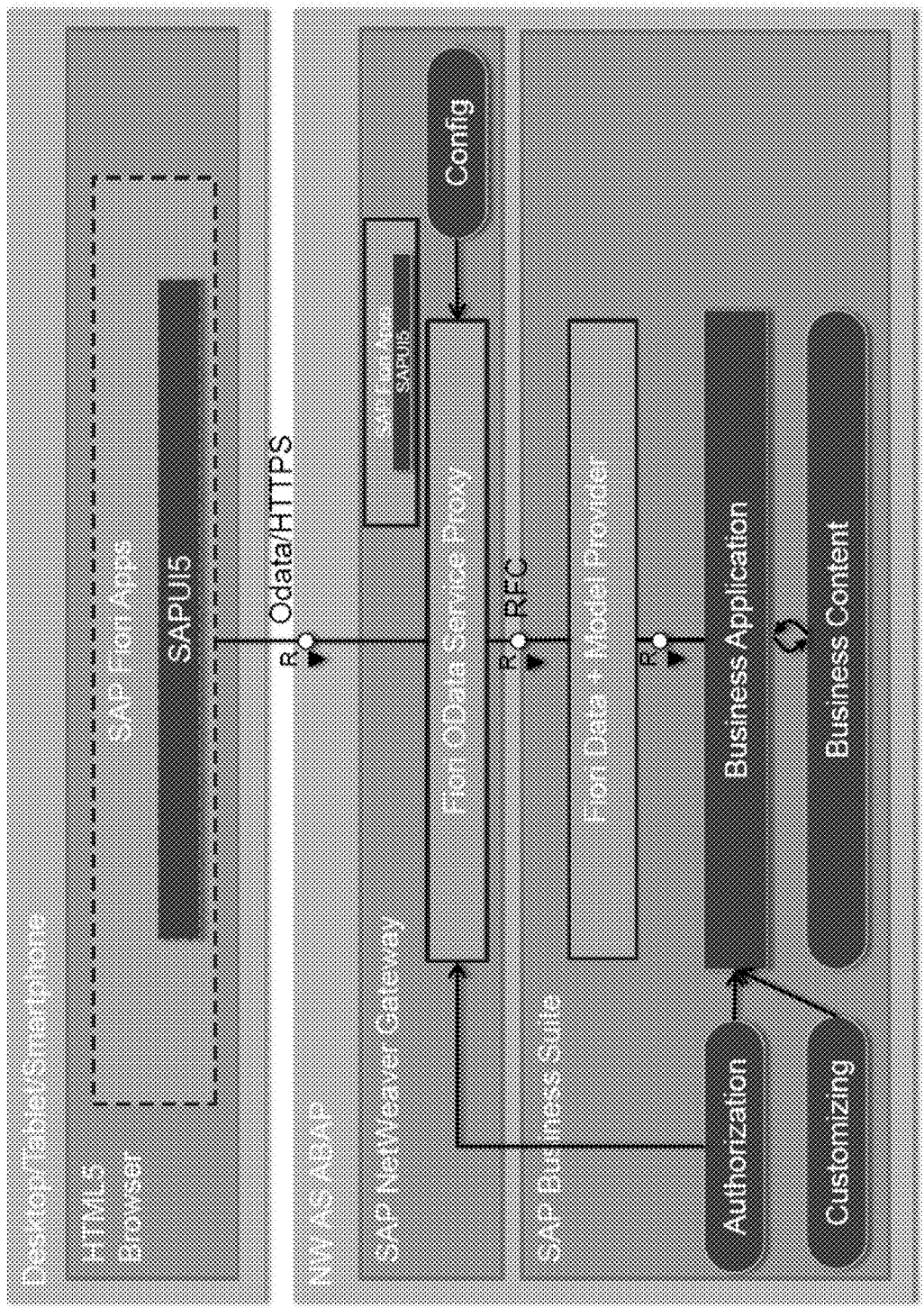
FIG. 3 is a simplified block diagram illustrating various components of one particular system configured to provide a tag cloud interface according to an example.

In this particular example, the integrated tag cloud is embedded as a frontend control in the FIORI HTML frontend technology available from SAP AG, of Walldorf, Germany. Alternatively, however, the interactive tag cloud could be implemented from a user interface natively built in HTML (e.g., HTML5). FIG. 3 is a simplified block diagram illustrating various components of a particular system utilized in this example, but of course others could be utilized.

In this example, the business data visualized in the interactive tag cloud, is retrieved through OData services during runtime from the SAP backend applications. Such SAP business applications are running optionally on SAP HANA database, or any other database used for the SAP Business Suite.

Here, the database comprises a table with one hundred and fifty eight (158) records (rows), each comprising measures of the following six (6) dimensions (columns):

| Equipment | Model | Location | Assignment | Installation Date | Status |
|---|---|---|---|---|---|
| <measure> | <measure> | <measure> | <measure> | <measure> | <measure> |
| <measure> | <measure> | <measure> | <measure> | <measure> | <measure> |

FIG. 3A shows the corresponding interactive tag cloud providing an overview of the data set in its pre-filtered state. The tag cloud comprises regions representing the following four (4) specific dimensions available above: •Model, •Status, •Location, •Assignment.

Figure 3B:

FIG. 3B shows the corresponding updated tag cloud resulting from the user interaction with the tag cloud to provide input for filtering the dataset. In particular, the user has clicked on the "Unassigned", "Alex Planner", and Tamara Smith tags in the "Assignment" quadrant, thereby de-selecting these dimension measures. The remaining selected tags produce the updated tag cloud reflecting a number of matching records (27) that is fewer than the total number of records (158) that are available. A selection panel located with the tag cloud in the interface, may be updated to list the selected names (i.e., Jim Mosby, Martin Walters). It is noted that this filtering action results in the removal of certain tags from the tag cloud (e.g., Dallas, 0817).

Additional interaction with the tags of the tag cloud is possible in order to provide still further filtered output. For example, a user may re-select or de-select additional tags, resulting in creation of further updated tag clouds by the engine for display by the interface.

In certain embodiments, further filtered input may operate based upon only a subset of the stored data, thereby enhancing processing speed. Thus where a filtering input from a user is assured to further narrow the scope of information visualized (i.e., rather than expanding the scope in some aspect), only the existing filtered data may be subject to the additional processing. This can conserve processing resources, and avoid delay attributable to manipulating large data volumes. By virtue of proximity to data in the database layer, an in-memory database engine (e.g., of the HANA in-memory database available from SAP SE of Walldorf, Germany) may be particularly useful in this regard.

User interaction with other than the tags of the tag cloud, is envisioned. Thus clicking upon the dimension region label could produce a pop-up list of relevant information. As an example, this may allow access to all entries which are not shown directly in the tag cloud owing to space considerations (i.e., there is a maximum amount of entries which can be displayed at once).

Further, as previously mentioned, the interactive tag cloud could also include panel(s) dedicated to receiving user input and/or providing relevant output. These can include icons, buttons, text link commands (e.g., "Save Selection as Default", "Revert to Default"), and/or lists of selected tags. For example, a user interacting with an element of the interface can result in display of the underlying data as a table on a separate screen.

FIG. 3C shows yet another example of a panel of an interactive tag cloud. This panel allows the user to select the dimension for each dimension region. This panel further allows user selection via drop-down boxes, of criteria forming the basis for tag relevance (e.g., number, criticality, usage, importance), with other criteria being possible. Changes can be implemented by the user interacting with an APPLY button in the interface. Particular embodiments may employ other types of button interfaces, for example allowing immediate restoration to default settings as mentioned above.

Figure 4:
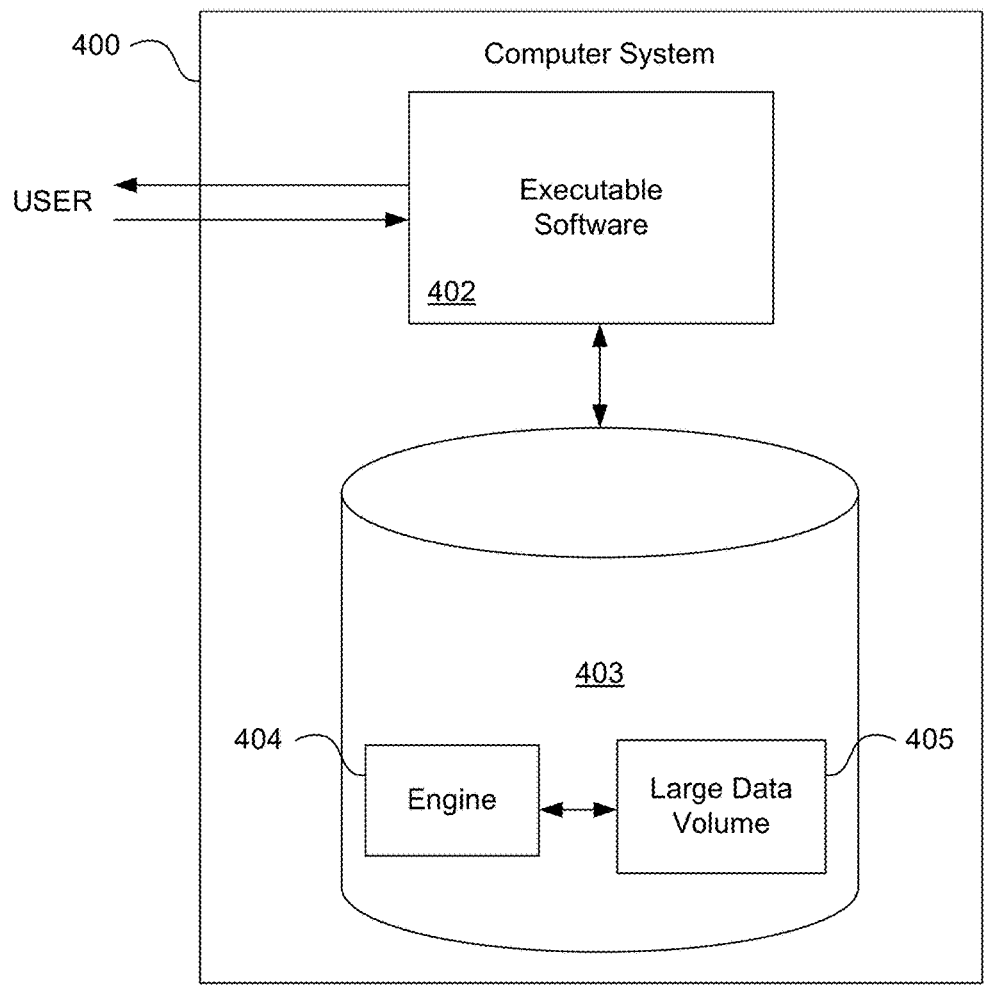
FIG. 4 illustrates hardware of a special purpose computing machine configured to provide an interactive tag cloud visualization according to an embodiment.

FIG. 4 illustrates hardware of a special purpose computing machine configured to provide an interactive tag cloud interface according to an embodiment. In particular, computer system 400 comprises a processor 402 that is in electronic communication with a non-transitory computer-readable storage medium 403. This computer-readable storage medium has stored thereon code 405 corresponding to stored data. Code 404 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 4, the engine is shown as being part of the database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an application layer overlying a database layer.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-435 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments along with examples of how aspects may be implemented. The above examples and embodiments should not be deemed to be the only embodiments, and are presented to illustrate the flexibility and potential benefits as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   providing an in-memory database engine in communication with an in-memory database storing a plurality of records comprising a first dimension and a second dimension;
   the in-memory database engine creating from the plurality of records, a visualization comprising,
     a first tag cloud region including a first tag of font size reflecting a first relevance criterion of a measure of the first dimension, and
     a second tag cloud region separated from the first tag cloud region by a first line, the visualization comprising a central region including a first numeral indicating a number of the plurality of records, the second tag cloud region including a second tag cloud of font size reflecting a second relevance criterion of a measure of the second dimension;

the in-memory database engine displaying the visualization to a user;

the in-memory database engine receiving a first filter parameter input to the visualization;

the in-memory database engine processing the plurality of records to create an updated visualization reflecting filtered records resulting from the first filter parameter input;

the in-memory database engine displaying the updated visualization to the user, a central region of the updated visualization including a second numeral indicating a number of the plurality of records meeting the first filter parameter input, wherein the first filter parameter input specifies a third dimension of the plurality of records, and the updated visualization further comprises a third tag cloud region separated from the first tag cloud region and from the second tag cloud region by a second line;

the in-memory database engine receiving a second filter parameter input to the updated visualization;

the in-memory database engine processing only the filtered records to create a further updated visualization; and the in-memory database displaying the further updated visualization to the user.

2. A method as in claim 1 wherein the first filter parameter input changes the first relevance criterion.

3. A method as in claim 1 wherein the first relevance criterion comprises a frequency of appearance.

4. A method as in claim 1 wherein the first relevance criterion comprises temporal information.

5. A method as in claim 1 wherein the first filter parameter input comprises interaction with the first tag.

6. A method as in claim 1 wherein the first filter parameter input comprises interaction with a dimension region label.

7. A method as in claim 1 wherein the first filter parameter input comprises interaction with a panel.

8. A method as in claim 1 wherein the first relevance criterion and the second relevance criterion are the same.

9. A non-transitory computer readable storage medium embodying a computer program for performing a method, said method comprising:

providing an in-memory database engine in communication with an in-memory database storing a plurality of records comprising a first dimension and a second dimension;

the in-memory database engine creating from the plurality of records, a visualization comprising,
  a first tag cloud region including a first tag of font size reflecting a first relevance criterion of a measure of the first dimension, and
  a second tag cloud region separated from the first tag cloud region by a first line, the visualization comprising a central region including a first numeral indicating a number of the plurality of records, the second tag cloud region including a second tag cloud of font size reflecting a second relevance criterion of a measure of the second dimension;

the in-memory database engine displaying the visualization to a user;

the in-memory database engine receiving a first filter parameter input to the visualization;

the in-memory database engine processing the plurality of records to create an updated visualization reflecting the first filter parameter input;

the in-memory database engine displaying the updated visualization to the user, a central region of the updated visualization including a second numeral indicating a number of the plurality of records meeting the first filter parameter input, wherein the first filter parameter input specifies a third dimension of the plurality of records, and the updated visualization further comprises a third tag cloud region separated from the first tag cloud region and from the second tag cloud region by a second line;

the in-memory database engine receiving a second filter parameter input to the updated visualization;

the in-memory database engine processing only the filtered records to create a further updated visualization; and the in-memory database displaying the further updated visualization to the user.

10. A non-transitory computer readable storage medium as in claim 9 wherein the first relevance criterion comprises a frequency of appearance.

11. A non-transitory computer readable storage medium as in claim 9 wherein the first relevance criterion comprises temporal information.

12. A non-transitory computer readable storage medium as in claim 9 wherein the first filter parameter input comprises interaction with the first tag.

13. A non-transitory computer readable storage medium as in claim 9 wherein the first filter parameter input comprises interaction with other than the first tag.

14. A computer system comprising:

one or more processors;

a software program, executable on said computer system, the software program configured to cause an in-memory database engine to:

communicate with an in-memory database storing a plurality of records comprising a first dimension and a second dimension;

create from the plurality of records, a visualization comprising,
  a first tag cloud region including a first tag of font size reflecting a first relevance criterion of a measure of the first dimension,
  a second tag cloud region separated from the first tag cloud region by a first line, and
  a central region including a first numeral indicating a number of the plurality of records, the second tag cloud region including a second tag cloud of font size reflecting a second relevance criterion of a measure of the second dimension;

display the visualization to a user;

receive a first filter parameter input to the visualization;

processing the plurality of records to create an updated visualization reflecting the first filter parameter input;

display the updated visualization to the user, a central region of the updated visualization including a second numeral indicating a number of the plurality of records meeting the first filter parameter input, wherein the first filter parameter input specifies a third dimension of the plurality of records, and the updated visualization further comprises a third tag cloud region separated from the first tag cloud region and from the second tag cloud region by a second line;

receive a second filter parameter input to the updated visualization;

process only the filtered records to create a further updated visualization; and display the further updated visualization to the user.

15. A computer system as in claim 14 wherein the first filter parameter input comprises an interaction with the first tag.

16. A computer system as in claim 14 wherein the first filter parameter input comprises an interaction with other than the first tag.

17. A computer system as in claim 14 wherein the first relevance criterion is a frequency of appearance or temporal information.

* * * * *